United States Patent
Nitta et al.

(10) Patent No.: US 12,333,619 B2
(45) Date of Patent: Jun. 17, 2025

(54) OPERATION INFORMATION MANAGEMENT METHOD AND INFORMATION PROCESSING

(71) Applicant: FSAS Technologies Inc., Kawasaki (JP)

(72) Inventors: Kenji Nitta, Yamato (JP); Kenji Itoh, Machida (JP); Kazuhiro Nakano, Kawasaki (JP); Anjie Zhang, Ota (JP); Toshihiro Kai, Souka (JP); Kota Iriguchi, Kawasaki (JP); Naoyuki Yoshimi, Kawasaki (JP); Mai Izawa, Ota (JP); Kenichi Takayanagi, Kawasaki (JP); Takayuki Nakamura, Kawasaki (JP)

(73) Assignee: FSAS Technologies Inc., Kawasaki (JP)

( * ) Notice: Subject to any disclaimer, the term of this patent is extended or adjusted under 35 U.S.C. 154(b) by 403 days.

(21) Appl. No.: 17/752,296

(22) Filed: May 24, 2022

(65) Prior Publication Data
US 2022/0405871 A1    Dec. 22, 2022

(30) Foreign Application Priority Data
Jun. 17, 2021    (JP) .................................. 2021-100572

(51) Int. Cl.
*G06Q 50/18*    (2012.01)
*G06Q 30/0645*    (2023.01)

(52) U.S. Cl.
CPC ......... *G06Q 50/18* (2013.01); *G06Q 30/0645* (2013.01)

(58) Field of Classification Search
CPC .. G06Q 50/18; G06Q 30/0645; H04L 41/082; H04L 41/5032; H04L 41/5058;
(Continued)

(56) References Cited

U.S. PATENT DOCUMENTS

| 2008/0086320 | A1* | 4/2008 | Ballew | G06Q 10/00 705/342 |
| 2011/0078074 | A1* | 3/2011 | Lipman | G06Q 20/10 705/347 |
| 2015/0281467 | A1 | 10/2015 | Chai et al. | |

FOREIGN PATENT DOCUMENTS

| JP | 2003-534748 | 11/2003 |
| JP | 2016-509789 | 3/2016 |

(Continued)

OTHER PUBLICATIONS

Extended European Search Report, dated Nov. 4, 2022, in corresponding European Patent Application No. 22174850.2 (9 pp.).

*Primary Examiner* — David R Lazaro
*Assistant Examiner* — Zia Khurshid
(74) *Attorney, Agent, or Firm* — STAAS & HALSEY LLP

(57) ABSTRACT

A storing unit stores therein contract information indicating, with respect to each of a plurality of devices rented to a user and included in a system, an expiration time point at which a rental contract of each of the plurality of devices expires and communication channel information indicating inter-device communication channels between the plurality of devices. A processing unit determines, based on the contract information and the communication channel information, a second device to experience effect of expiration of the rental contract of a first device at a first time point amongst the plurality of devices, and outputs information indicating the effect on the second device.

8 Claims, 13 Drawing Sheets

(58) Field of Classification Search
CPC ............. H04L 41/0853; H04L 41/5012; H04L 43/0805; H04L 41/0893; H04L 41/0894; H04L 41/22; H04L 43/0876
See application file for complete search history.

(56) References Cited

FOREIGN PATENT DOCUMENTS

| | | |
|---|---|---|
| JP | 2017-84271 | 5/2017 |
| JP | 2018-197978 | 12/2018 |
| WO | WO01/90843 | 11/2001 |

\* cited by examiner

STORING UNIT 110

NETWORK PATH INFORMATION 111

| DEVICE NAME | SERIAL NUMBER | PARENT DEVICE NAME |
|---|---|---|
| R1 | A | — |
| ST1 | B | R1 |
| SV1 | C | R1 |
| R2 | D | R1 |
| R3 | E | R2 |
| ST2 | F | R2 |
| SV2 | G | R2 |
| SV3 | H | R3 |

FIG. 5

OPERATION INFORMATION MANAGEMENT METHOD AND INFORMATION PROCESSING

CROSS-REFERENCE TO RELATED APPLICATION

This application is based upon and claims the benefit of priority of the prior Japanese Patent Application No. 2021-100572, filed on Jun. 17, 2021, the entire contents of which are incorporated herein by reference.

FIELD

The embodiments discussed herein relate to an operation information management method and information processing apparatus.

BACKGROUND

A business model called subscription is sometimes used to provide users with a product or service. A subscription is a product or service usage form where a provider of a product or service collects fees from users at each specified contract period and grants to them the right of access to the product or service during the contract period.

There is, for example, a proposed e-learning apparatus for managing contract information of customers who use Software-as-a-Service (SaaS) e-learning, including contract start months, contract periods, and scheduled end months.

There is also a proposed charging system for creating a policy pertaining to, for example, dynamic or static charging according to contract information stored in a subscription profile repository (SPR) and some local policies set by an operator.

Further, there is a proposed apparatus for grouping network device resources and limiting the access of each user to resources corresponding to group names listed in a user profile associated with the user, to thereby provide a granular view of each network device in a network. According to the proposed apparatus, views of customers are limited only to network device resources to which they have subscriptions.

See, for example, Japanese Laid-open Patent Publication No. 2017-84271 and Japanese National Publication of International Patent Application Nos. 2016-509789 and 2003-534748.

An information processing system and services on the information processing system used by a user are sometimes operated by multiple devices rented under rental contracts. It is often the case that individual devices have different rental contract periods. In this case, a device being no longer available due to expiration of the rental contract may affect other devices with the contracts remaining in effect and operations of the services.

SUMMARY

According to one aspect, there is provided a non-transitory computer-readable recording medium storing therein an operation information management program that causes a computer to execute a process including determining, based on contract information indicating, with respect to each of a plurality of devices rented to a user and included in a system, an expiration time point at which a rental contract of the each of the plurality of devices expires and communication channel information indicating inter-device communication channels between the plurality of devices, a second device to experience effect of expiration of the rental contract of a first device at a first time point amongst the plurality of devices; and outputting information indicating the effect on the second device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of network path information.

DESCRIPTION OF EMBODIMENTS

Several embodiments will be described below with reference to the accompanying drawings.

(a) First Embodiment

Figure 1:
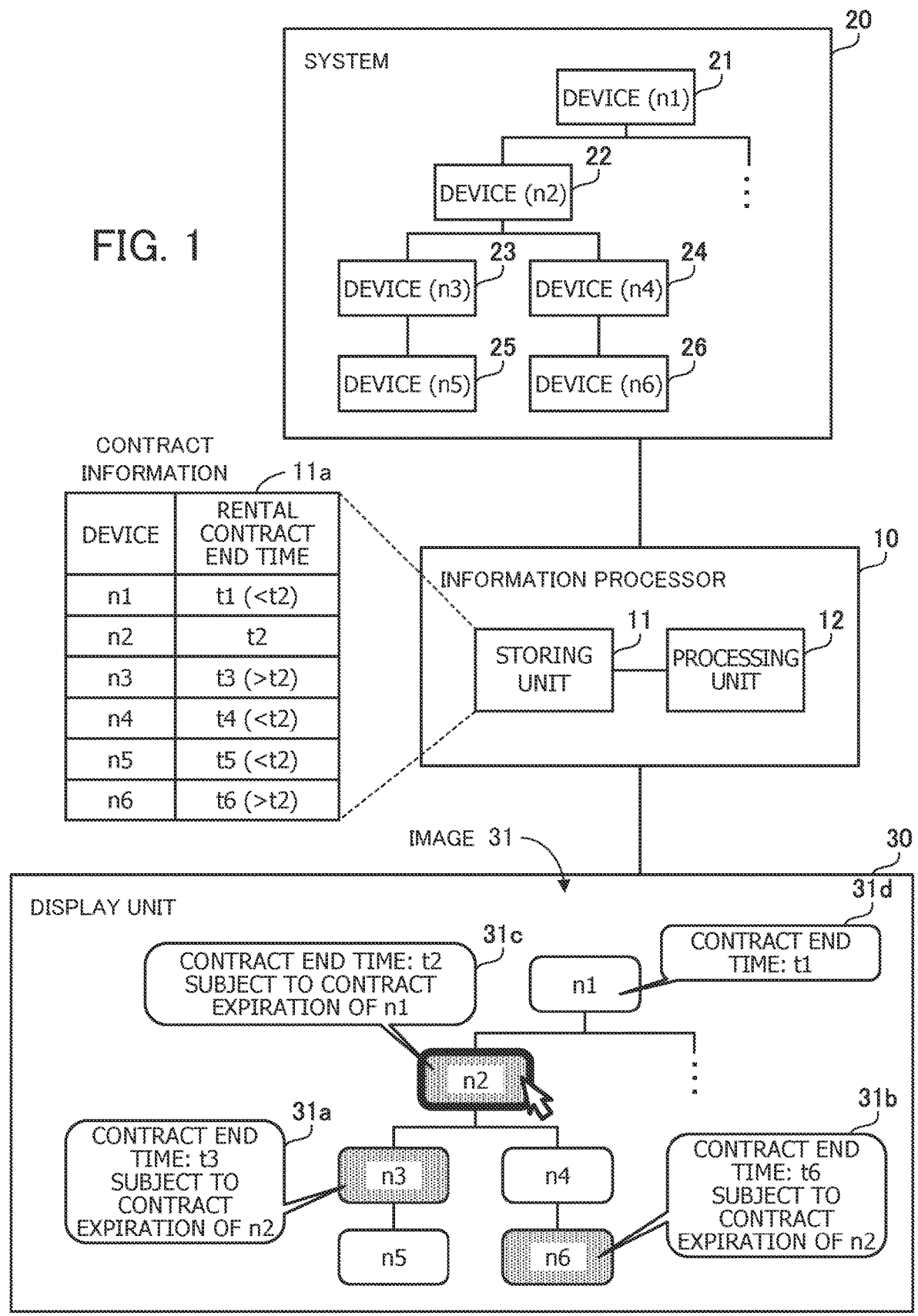
FIG. 1 illustrates an information processor according to a first embodiment.

A first embodiment is described hereinafter.
FIG. 1 illustrates an information processor according to the first embodiment.
An information processor 10 illustrated in FIG. 1 manages operation information of multiple devices provided on subscription bases. For example, the information processor 10 manages devices included in a system 20 operated by a user. The information processor 10 is connected to the system 20 via a network, which may be a local area network (LAN), a wide area network (WAN), or the Internet. As an example, the system 20 includes devices 21, 22, 23, 24, 25, and 26. The devices 21 to 26 are, for example, server computers, storage devices, routers, and switches.

The devices 21 to 26 are rented to the user by a business operator. With respect to each of the devices 21 to 26, the period of the device available to the user is determined by a contract between the user and the business operator. Therefore, the periods of the devices 21 to 26 available to the user may vary for each device.

The information processor 10 includes a storing unit 11 and a processing unit 12. The storing unit 11 may be a volatile storage device such as random access memory (RAM), or a non-volatile storage device such as a hard disk drive (HDD) or flash memory. The processing unit 12 may include, for example, a central processing unit (CPU), a digital signal processor (DSP), an application specific integrated circuit (ASIC), and a field programmable gate array (FPGA). The processing unit 12 may be a processor for executing programs. The term "processor" here includes a set of multiple processors (i.e., multiprocessor).

The information processor 10 is connected to a display unit 30 which displays images corresponding to image information output from the information processor 10. The display unit 30 may be connected to a different information processor which communicates with the information processor 10 via a network.

The storing unit 11 stores therein contract information 11*a* indicating end times of the rental contracts of the individual devices included in the system 20. The contract information 11*a* is information representing contract contents according to the contracts between the business operator and the user, and is preliminarily stored in the storing unit 11. Here, the devices 21 to 26 are individually given identification information "n1" to "n6". The contract information 11*a* indicates, for example, the following end times of the rental contracts (hereinafter referred to simply as "rental contract end times") for the devices 21 to 26.

The rental contract end time of the device 21 corresponding to the identification information n1 is t1. The rental contract end time of the device 22 corresponding to the identification information n2 is t2. The rental contract end time of the device 23 corresponding to the identification information n3 is t3. The rental contract end time of the device 24 corresponding to the identification information n4 is t4. The rental contract end time of the device 25 corresponding to the identification information n5 is t5. The rental contract end time of the device 26 corresponding to the identification information n6 is t6.

Assume, for example, that the rental contract end times t1 and t3 to t6 have following relationships with the rental contract end time t2: t1 comes before t2, i.e., t1<t2; t3 comes after t2, i.e., t3>t2; t4 comes before t2, i.e., t4<t2; t5 comes before t2, i.e., t5<t2; and t6 comes after t2, i.e., t6>t2.

The storing unit 11 also stores therein communication channel information indicating communication channels between the devices in the system 20. In the system 20, the device 22 connected to the device 21 is subordinate to the device 21. Different devices may also be subordinate to the device 21. Under the device 22, the devices 23 and 24 are connected. The device 25 is subordinate to the device 23 while the device 26 is subordinate to the device 24. The communication channel information indicates the aforementioned inter-device connection topology. Two devices directly connected to each other are able to communicate. A device located between two devices relays communication between them. Therefore, the communication channel information represents inter-device communication channels. In the network of the system 20, for example, a device with a smaller number of intermediate devices (number of hops) through which communication passes to reach a router or switch on a core system side (e.g., a device closer to the device 21) is superordinate to a device with a larger number of hops (e.g., a device further away from the device 21).

The processing unit 12 detects, based on the contract information 11*a* stored in the storing unit 11, that the contract of a first device amongst the multiple devices ends at a first time point. In this regard, the processing unit 12 may identify the first device by receiving a choice of device from the user. For example, the processing unit 12 may set a device selected by the user as the first device. Alternatively, with a predetermined period of time, the processing unit 12 may periodically perform a process of identifying, in the contract information 11*a*, a device whose contract expires within a prescribed period from the present time as the first device.

Let us consider the case where the processing unit 12 receives user's choice of, for example, the device 22. The processing unit 12 may receive a choice of the device 22 by causing the display unit 30 to display an image 31 that includes icons of the devices 21 to 26 and connection relationships among the devices 21 to 26 and then receiving the selection of the icon of the device 22 made by the user on the image 31. In the image 31 of FIG. 1, the device 22 being selected by the arrow-shaped pointer is depicted by the rectangular box with bold line delineating the icon with the identification information "n2" that corresponds to the device 22. In this case, the processing unit 12 sets the device 22 as the first device. According to the contract information 11*a*, the rental contract end time of the device 22 is t2.

The processing unit 12 determines, based on the contract information 11*a* and the communication channel information stored in the storing unit 11, a second device to be affected by expiration of the contract of the first device at the first time point. Specifically, the processing unit 12 determines whether expiration of the contract of the first device affects one or more different devices by comparing the first time point at which the contract of the first device ends and a second time point at which the contract of each different device ends.

The processing unit 12 determines that expiration of the contract of the first device affects the different device when the first time point comes before the second time point. This is because, if the first device becomes no longer available at the first time point although the rental contract of the different device remains valid after the first time point, the different device is not able to communicate via the first device. Thus, expiration of the contract of the first device affects operation of the different device.

On the other hand, the processing unit 12 determines that expiration of the contract of the first device has no impact on the different device if the first time point comes at or after the second time point. This is because, even if the first device becomes no longer available at the first time point, the different device is not in use at the first time point because the rental contract of the different device has finished before the first time point. Thus, expiration of the contract of the first device has no effect on operation of the different device.

Note here that the processing unit 12 may limit different devices targeted for judgment of influences of rental contract expiration of the first device to those subordinate to the first device, or may instead target devices both superordinate and subordinate to the first device. In the example described in this section, the processing unit 12 also determines, with respect to each device superordinate to the first device, whether expiration of the rental contract of the superordinate device affects the first device, and outputs the determination results, as will be discussed later. Therefore, the following illustrates the case where different devices targeted for judgment of influences of rental contract expiration of the first device are limited to those subordinate to the first device.

Note that, if there is one or more devices at even lower tiers than direct subordinates of the first device, the processing unit 12 also compares the first time point with the contract end time of each of the lower-tier devices, to determine if there is the effect of contract expiration of the first device. In this manner, the processing unit 12 repeats determining the influences by comparing, for each device subordinate to the first device, the contract end time of the subordinate device and the first time point. The processing unit 12 continues identifying devices to be affected until reaching terminal devices.

For example, given that the device 22 is the first device, the processing unit 12 identifies the devices 23 to 26 subordinate to the device 22 based on the communication channel information.

The processing unit 12 determines, based on the contract information 11a, the influence of the contract end of the device 22 on the device 23. The rental contract end time t3 of the device 23 comes after the rental contract end time t2 of the device 22. In this case, the processing unit 12 determines that the contract end of the device 22 affects the device 23.

The processing unit 12 determines, based on the contract information 11a, the effect of the contract end of the device 22 on the device 24. The rental contract end time t4 of the device 24 comes before the rental contract end time t2 of the device 22. In this case, the processing unit 12 determines that the contract end of the device 22 has no effect on the device 24.

The processing unit 12 also compares t2 against each of the rental contract end times t5 and t6 of the devices 25 and 26, to determine whether the contract end of the device 22 affects the devices 25 and 26. In this case, because of t5<t2, the processing unit 12 determines that there is no effect on the device 25. On the other hand, because of t6>t2, the processing unit 12 determines that the device 26 would be affected.

In the example described above, the devices 23 and 26 are examples of the second device to be affected by expiration of the contract of the first device at the first time point when the device 22 is the first device.

Note that the processing unit 12 is also able to determine if expiration of the contract of a third device superordinate to the first device affects the first device in a similar manner to determining the effect of expiration of the contract of the first device on a different device. For example, the processing unit 12 identifies, based on the communication channel information, the device 21 superordinate to the device 22. Then, the processing unit 12 determines the effect of contract expiration of the device 21 on the device 22 by comparing, based on the contract information 11a, the rental contract end time t1 of the device 21 and the rental contract end time t2 of the device 22. In this case, because of t1<t2, the processing unit 12 determines that contract expiration of the device 21 affects the device 22. If there is a device even superordinate to the device 21, the processing unit 12 may also determine the effect of contract expiration of the superordinate device on the device 22.

As has been described above, in response to selection of the device 22 by the user, the processing unit 12 may detect, not only contract expiration of the device 22 affecting the devices 23 and 26, but also the device 22 being subject to contract expiration of the device 21.

The processing unit 12 outputs information about the effect on the second device. The processing unit 12 presents messages 31a and 31b to the user indicating that the devices 23 and 26 are going to be affected by contract expiration of the device 22, for example, by causing the display unit 30 to display the image 31 with the messages 31a and 31b or transmitting the messages 31a and 31b to a different information processor via a network. At this time, the processing unit 12 may output the rental contract end times t2, t3, and t6 of the devices 22, 23, and 26, respectively, to notify the user of the points in time after t2, at which the devices 23 and 26 become individually affected.

In addition, in the case of having identified the third device that affects the first device, the processing unit 12 may output information about the effect on the first device due to contract expiration of the third device, in addition to the information about the effect on the second device. The processing unit 12 presents a message 31c to the user indicating that the device 22 is subject to contract expiration of the device 21, for example, by causing the display unit 30 to display the image 31 with the message 31c or transmitting the message 31c to a different information processor via a network. At this time, the processing unit 12 may output the contract end times t1 and t2 of the devices 21 and 22, respectively, to notify the user of the point in time after t1, at which the device 22 becomes affected. A message 31d on the image 31 indicates the rental contract end time t1 of the device 21.

According to the information processor 10, the storing unit 11 stores contract information indicating rental contract expiration time points of individual devices in a system that includes multiple devices rented to a user; and communication channel information indicating inter-device communication channels of the multiple devices.

Based on the contract information and the communication channel information, one or more second devices to be affected by contract expiration of the first device at the first time point are identified amongst the multiple devices, and information about the effect on the second devices is output.

Herewith, it is possible to prevent devices with the contracts remaining in effect from being affected.

For example, in the case where the user has selected the device 22, the processing unit 12 presents messages to the user indicating that the devices 23 and 26 are going to be affected by expiration of the contract of the device 22. In this manner, the information processor 10 prompts the user to review, e.g., extend, the expiration of the contract term of the device 22 and thus supports the user by preventing the devices 23 and 26 from being affected by expiration of the contract of the device 22. The information processor 10 also supports the user to be able to continue operations of the user's system and services running on the system.

In addition, in the case where the user has selected the device 22, the processing unit 12 may present a message to the user indicating that the device 22 is going to be affected by expiration of the contract of the device 21. That is, the processing unit 12 may output not only information about the effect of the first device on the second device, but also information about the effect of the third device on the first device, thus presenting both devices being affected by the first device and those affecting the first device to the user.

Herewith, the information processor 10 is able to prompt the user to review, e.g., extend, the expiration of the contract term of the device 21 and thus supports the user by preventing the device 22 from being affected by expiration of the contract of the device 21. In addition, the information processor 10 is able to collectively present, to the user, the extent of the influences within the entire system 20, where devices bear parent and child relationships with the device 22 specified by the user as a starting point. Therefore, the information processor 10 is able to support the user to readily comprehend the extent of the influences associated with the device selected by the user.

Next described are further details of the functions of the information processor 10.

(b) Second Embodiment

A second embodiment is described hereinafter.

Figure 2:
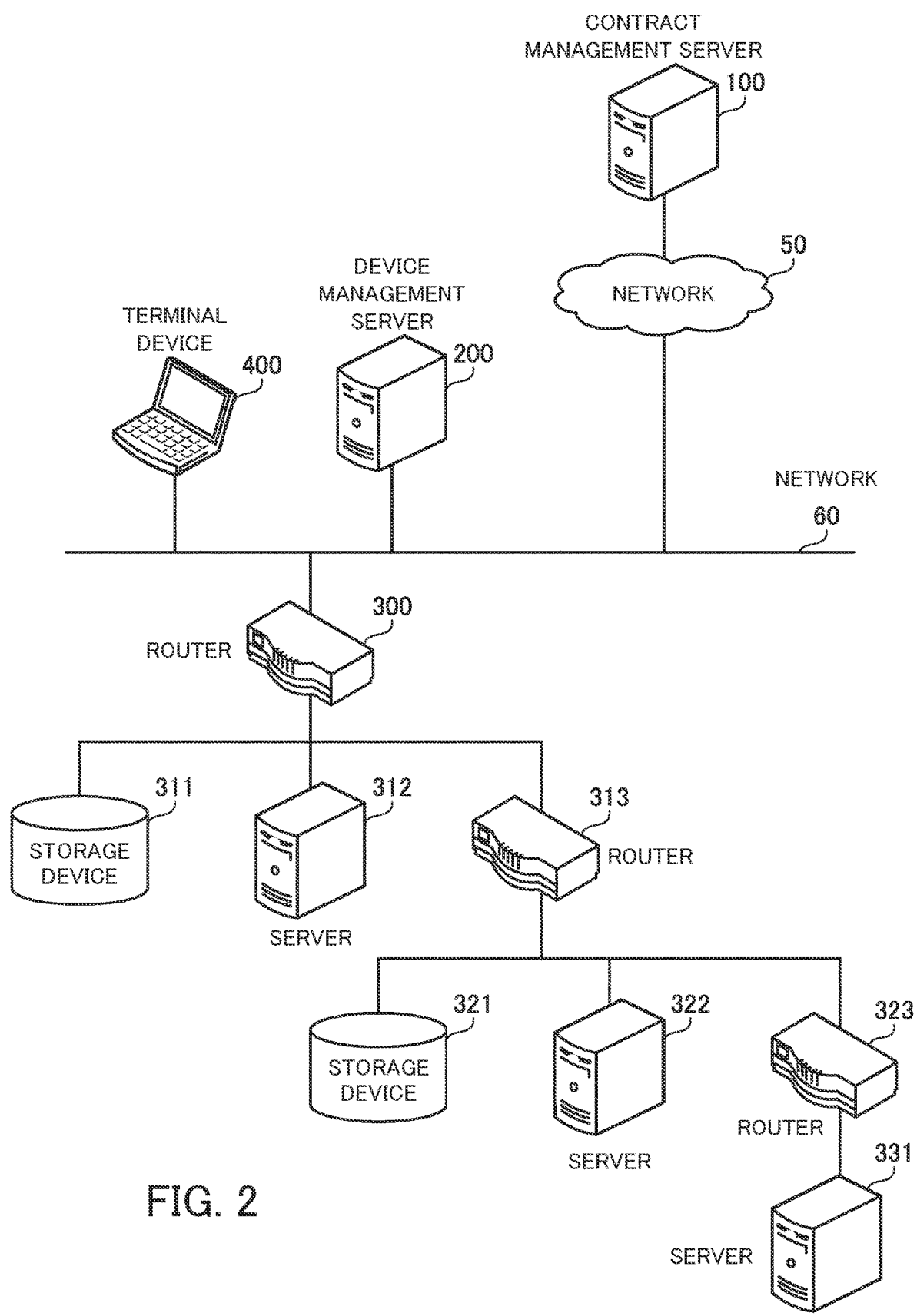
FIG. 2 illustrates an example of an information processing system according to a second embodiment.

FIG. 2 illustrates an example of an information processing system according to the second embodiment.

The information processing system of the second embodiment includes a contract management server 100, a device management server 200, routers 300, 313, and 323, storage devices 311 and 321, servers 312, 322, and 331, and a terminal device 400. Among these, the device management server 200, the routers 300, 313, and 323, the storage devices 311 and 321, the servers 312, 322, and 331, and the terminal device 400 form a system operated by a user.

The routers 300, 313, and 323, the storage devices 311 and 321, the servers 312, 322, and 331, and the terminal device 400 are equipment rented to the user on subscription bases.

The contract management server 100 is a server computer run by a business operator who rents various types of equipment to the user through subscription. The contract management server 100 manages, for example, information on contracts of devices rented to the user and charging information. The contract management server 100 is an example of the information processor 10 of the first embodiment. The contract management server 100 is connected to a network 50, which is, for example, a WAN or the Internet.

The device management server 200 is a server computer for managing the routers 300, 313, and 323, the storage devices 311 and 321, and the servers 312, 322, and 331. The device management server 200 is connected to a network 60, which is, for example, a LAN set up at a base of the user. The network 60 is connected to the network 50.

The routers 300, 313, and 323 are communication devices for relaying communication between the devices. The storage devices 311 and 321 are network attached storage (NAS) devices for storing data used by the servers 312 and 322, respectively, for their processing. The servers 312, 322, and 331 are server computers for providing the user with services by running predetermined applications.

The routers 300, 313, and 323, the storage devices 311 and 321, and the servers 312, 322, and 331 have the following connection relationship with each other. Note that the router 300 is a first-tier device amongst those rented out, and each device at a lower tier needs to go through a larger number of devices to reach the network 60. The router 300 is connected to the network 60.

The storage device 311, the server 312, and the router 313 are connected to the router 300. The storage device 311, the server 312, and the router 313 are subordinate to the router 300, and thus regarded as child devices of the router 300. The router 300 is superordinate to the storage device 311, the server 312, and the router 313, and thus regarded as a parent device of the storage device 311, the server 312, and the router 313.

The storage device 321, the server 322, and the router 323 are connected to the router 313. The storage device 321, the server 322, and the router 323 are subordinate to the router 313, and thus regarded as child devices of the router 313. The router 313 is superordinate to the storage device 321, the server 322, and the router 323, and thus regarded as a parent device of the storage device 321, the server 322, and the router 323.

The server 331 is connected to the router 323. The server 331 is subordinate to the router 323, and thus regarded as a child device of the router 323. The router 323 is superordinate to the server 331, and thus regarded as a parent device of the server 331.

The terminal device 400 is a client computer operated by the user.

Figure 3:
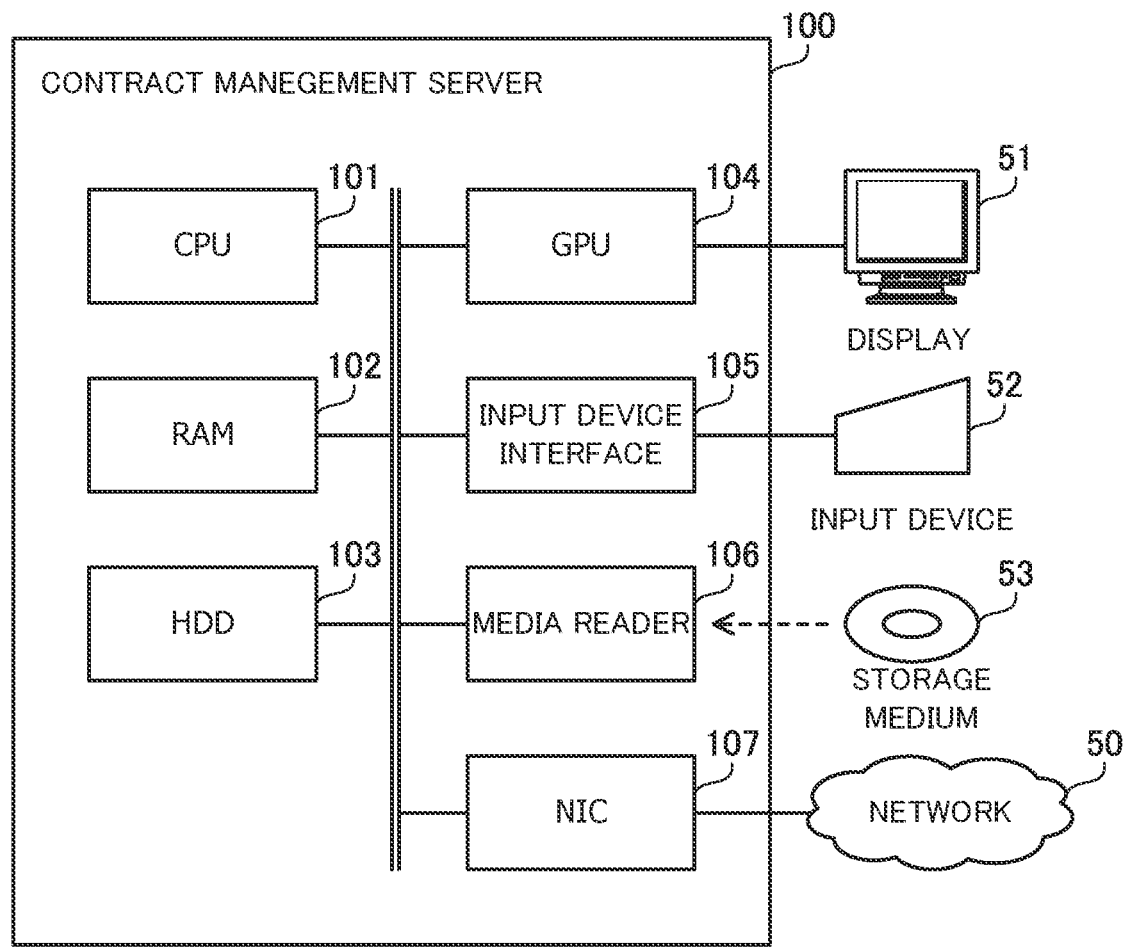
FIG. 3 is a block diagram illustrating an example of hardware of a contract management server.

FIG. 3 is a block diagram illustrating an example of hardware of the contract management server.

The contract management server 100 includes a CPU 101, a RAM 102, an HDD 103, a graphics processing unit (GPU) 104, an input device interface 105, a media reader 106, and a network interface card (NIC) 107. Note that the CPU 101 is an example of the processing unit 12 of the first embodiment. The RAM 102 or the HDD 103 is an example of the storing unit 11 of the first embodiment.

The CPU 101 is a processor configured to execute program instructions. The CPU 101 reads out at least part of programs and data stored in the HDD 103, loads them into the RAM 102, and executes the loaded programs. Note that the CPU 101 may include two or more processor cores. The contract management server 100 may include two or more processors. Processes described below may be run in parallel using multiple processors or processor cores. The term "multiprocessor", or simply "processor", may be used to refer to a set of processors.

The RAM 102 is volatile semiconductor memory for temporarily storing therein programs to be executed by the CPU 101 and data to be used by the CPU 101 for its computation. The contract management server 100 may be provided with a different type of memory other than RAM, or may be provided with two or more memory devices.

The HDD 103 is a non-volatile storage device to store therein software programs, such as an operating system (OS), middleware, and application software, and various types of data. The contract management server 100 may be provided with a different type of storage device, such as flash memory or a solid state drive (SSD), or may be provided with two or more non-volatile storage devices.

The GPU 104 produces video images in accordance with drawing commands from the CPU 101 and displays them on a screen of a display 51 coupled to the contract management server 100. The display 51 may be any type of display, such as a cathode ray tube (CRT) display; a liquid crystal display (LCD); a plasma display; or an organic electro-luminescence (OEL) display.

The input device interface 105 receives an input signal from an input device 52 connected to the contract management server 100 and supplies the input signal to the CPU 101. Various types of input devices may be used as the input device 52, for example, a pointing device, such as a mouse, a touch panel, a touch-pad, and a trackball; a keyboard; a remote controller; and a button switch. Multiple types of input devices may be connected to the contract management server 100.

The media reader 106 is a reading device for reading out programs and data encoded on a storage medium 53. The storage medium 53 may be, for example, a magnetic disk, an optical disk, a magneto-optical disk (MO), or semiconductor memory. Examples of the magnetic disk are a flexible disk (FD) and an HDD. Examples of the optical disk are a compact disc (CD) and a digital versatile disc (DVD).

The media reader 106 copies the programs and data read out from the storage medium 53 to a different storage medium, for example, the RAM 102 or the HDD 103. The read programs are executed, for example, by the CPU 101. Note that the storage medium 53 may be a portable storage medium and used to distribute the programs and data. In addition, the storage medium 53 and the HDD 103 are sometimes referred to as computer-readable storage media.

The NIC 107 is an interface connected to the network 50 and used to communicate with different computers, including the device management server 200, via the network 50. The NIC 107 is connected, for example, to communication devices such as switches and routers by cables. Alternatively, the NIC may be wirelessly connected to such communication devices.

The same hardware configuration of the contract management server 100 of FIG. 3 may similarly be applied to the device management server 200, the servers 312, 322, and 331, and the terminal device 400.

Figure 4:
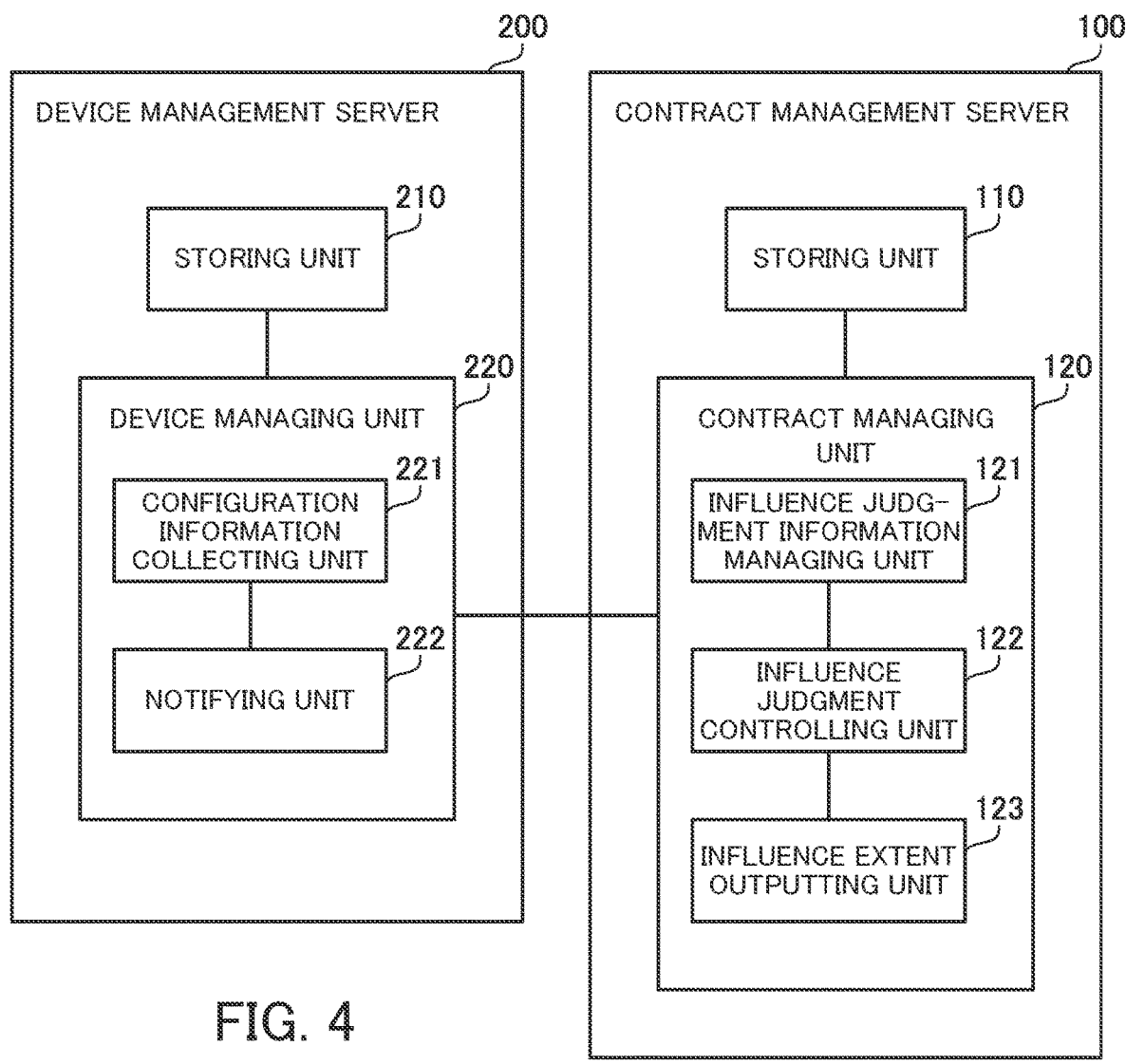
FIG. 4 is a block diagram illustrating an example of functions of the contract management server and a device management server.

FIG. 4 is a block diagram illustrating an example of functions of the contract management server and the device management server.

The contract management server 100 includes a storing unit 110 and a contract managing unit 120. The storing unit 110 is implemented with the use of a storage area of the RAM 102 or the HDD 103. The contract managing unit 120 is implemented by the CPU 101 executing a program stored in the RAM 102.

The storing unit 110 stores therein network path information, contract information, and an influence judgment information table. The network path information indicates connection relationships of the routers 300, 313, and 323, the storage devices 311 and 321, and the servers 312, 322, and 331. The network path information is notified by the device management server 200.

The contract information indicates details of contracts of the individual devices rented to the user. The contract information includes information on an expiration time point of the rental contract of each device. The expiration time point of the rental contract is expressed, for example, as a contract ending date. The contract ending date indicates that the rental contract expires at the end of the day, i.e., midnight of the following day of the expiration date. Continuing use of a device by the user after the rental contract of the device has expired is a breach of the contract. Therefore, the user is not able to keep using a device for which the rental contract has ended. The contract information is preliminarily stored in the storing unit 110.

The influence judgment information table includes information indicating, with respect to each of the rented devices, the results of judging the effect on one or more child devices due to contract expiration of the device, as well as the effect on the device due to contract expiration of one or more parent devices of the device.

The contract managing unit 120 manages the contracts of the devices rented to the user. The contract managing unit 120 also manages the effect on other devices due to contract expiration of each of the devices rented to the user. The contract managing unit 120 includes an influence judgment information managing unit 121, an influence judgment controlling unit 122, and an influence extent outputting unit 123.

The influence judgment information managing unit 121 maps information of each device included in the network path information stored in the storing unit 110 to a corresponding contract ending date included in the contract information, and adds the mappings to the influence judgment information table.

The influence judgment controlling unit 122 judges, with respect to each of the devices, the effect on a different device due to contract expiration of the device based on a parent and child relationship of the device in the network path information and the contract ending date of the device mapped by the influence judgment information managing unit 121. The influence judgment controlling unit 122 adds the results of the influence judgment to the influence judgment information table. For example, when the rental contract of a device is over, communication between the device and a different device is no longer available. As a result, the different device is unable not only to cooperate with the device whose contract has expired, but also to communicate with yet another device via the device with the expired contract. Consequently, the different device suffers from failing to deliver its services and the like properly.

The influence extent outputting unit 123 outputs, based on the influence judgment information table, information on the effect on a different device due to contract expiration of a particular device. For example, the influence extent outputting unit 123 may select the particular device according to a device selected by a business operator-side administrator operating the contract management server 100 or a user-side administrator operating the terminal device 400. The influence extent outputting unit 123 may cause the display 51 to display details of the influences for the different device due to contract expiration of the particular device, or may transmit the information on the influences to the terminal device 400, which then displays the details.

The device management server 200 includes a storing unit 210 and a device managing unit 220. The storing unit 210 is implemented with the use of a storage area in RAM or HDD of the device management server 200. The device managing unit 220 is implemented by a CPU of the device management server 200 executing a program stored in the RAM of the device management server 200.

The storing unit 210 stores therein configuration information on the devices rented on subscription bases, i.e., the routers 300, 313, and 323, the storage devices 311 and 321, and the servers 312, 322, and 331. The configuration information may include, with respect to each of the devices, identification information; address information, such as a media access control (MAC) address and an Internet Protocol (IP) address; operation logs including operation start and end times; and information on operating times.

The address information may include a MAC address table held by each of the devices. The MAC address tables describe inter-device connection relationships at layer 2 of the Open Systems Interconnection (OSI) reference model. The storing unit 210 also stores therein the network path information. For example, the network path information may be generated based on the address information included in the configuration information.

The device managing unit 220 manages the devices rented to the user on subscription bases. The device managing unit 220 includes a configuration information collecting unit 221 and a notifying unit 222.

The configuration information collecting unit 221 regularly collects the configuration information of the routers 300, 313, and 323, the storage devices 311 and 321, and the servers 312, 322, and 331 and then stores it in the storing unit 210. The configuration information collecting unit 221 generates the network path information based on the collected configuration information and then stores it in the storing unit 210. In response to modification of the configuration information, the configuration information collecting unit 221 updates the network path information.

The notifying unit 222 periodically transmits, to the contract management server 100, the configuration information and the network path information generated by the configuration information collecting unit 221.

Note that the contract management server 100 may manage charging for the user according to each device rented to the user. For example, the contract management server 100 may charge a certain amount of fees for the user according to each rental device and the rental contract period of the device. Alternatively, the contract management server 100 may adopt a pay-as-you-go billing system, which charges for the operating time of each device rented to the user, based on the configuration information received from the device management server 200.

FIG. 5 illustrates an example of the network path information.

Network path information 111 is acquired from the device management server 200 and then stored in the storing unit 110. The network path information 111 includes the following items: DEVICE NAME; SERIAL NUMBER; and PARENT DEVICE NAME.

Under "DEVICE NAME", the names of the devices are registered. Under "SERIAL NUMBER", serial numbers are registered, which are identification information for identifying the corresponding devices. Under "PARENT DEVICE NAME", parent device names are registered.

The router 300 is given a device name of "R1" and a serial number of "A". The storage device 311 is given a device name of "ST1" and a serial number of "B". The server 312 is given a device name of "SV1" and a serial number of "C". The router 313 is given a device name of "R2" and a serial number of "D". The storage device 321 is given a device name of "ST2" and a serial number of "F". The server 322 is given a device name of "SV2" and a serial number of "G". The router 323 is given a device name of "R3" and a serial number of "E". The server 331 is given a device name of "SV3" and a serial number of "H".

For example, the network path information 111 includes a registered record with the device name "R1"; the serial number "A"; and the parent device name "-" (not assigned). This record refers to the router 300. The router 300 has no parent device because it is a first-tier device in the network configuration made up of the routers 300, 313, and 323, the storage devices 311 and 321, and the servers 312, 322, and 331.

The network path information 111 also includes a registered record with the device name "ST1"; the serial number "B"; and the parent device name "R1". This record refers to the storage device 311 and indicates that the router 300 is the parent device of the storage device 311.

In the network path information 111, records individually referring to the routers 313 and 323, the storage devices 311 and 321, and the servers 312, 322, and 331 are also registered in the same way.

Thus, the network path information 111 represents the connection relationships of the routers 300, 313, and 323, the storage devices 311 and 321, and the servers 312, 322, and 331.

Figure 6:
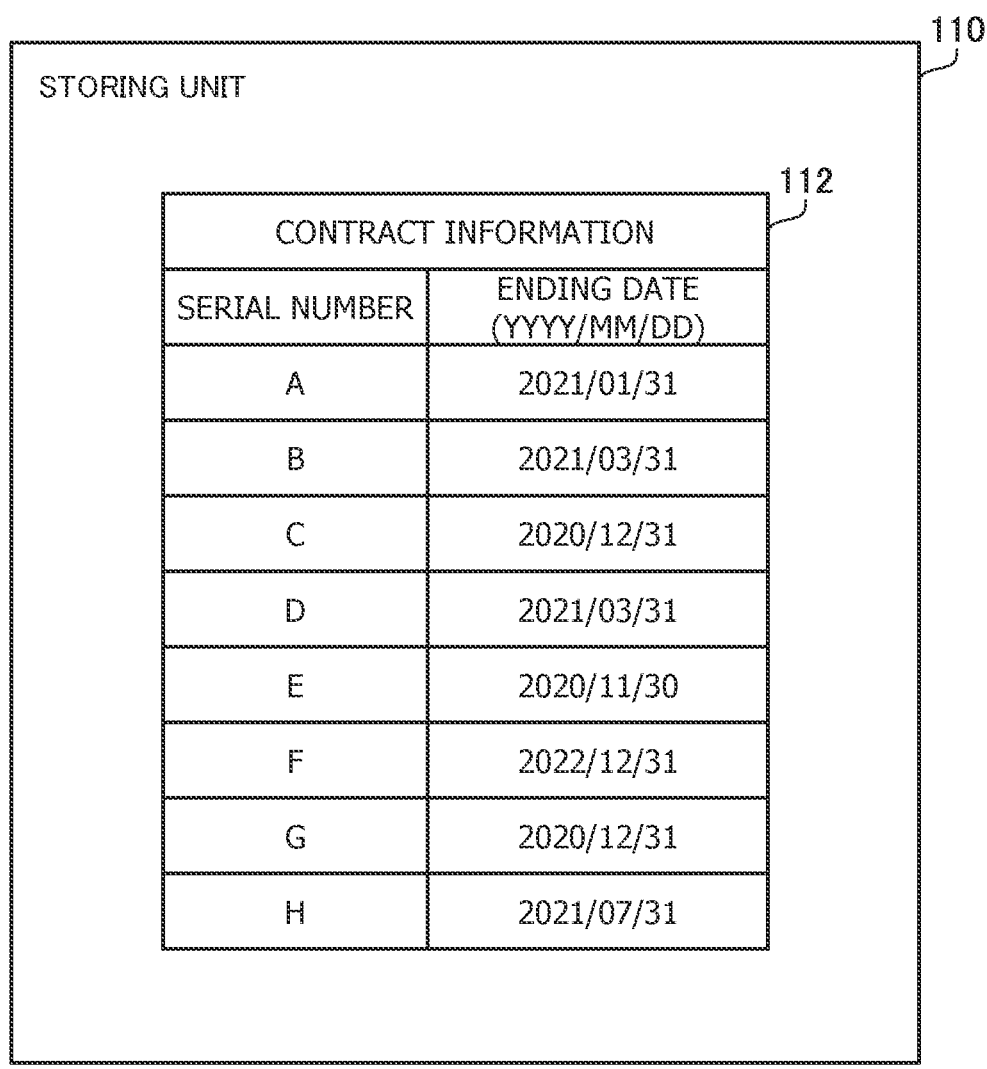
FIG. 6 illustrates an example of contract information.

FIG. 6 illustrates an example of the contract information.

Contract information 112 is preliminarily stored in the storing unit 110. For example, once a rental contract of a device is signed between the user and the business operator, information on the contract is input to the contract management server 100. Based on the information on the contract, the contract management server 100 adds a record on the device to the contract information 112. The contract information 112 includes the following items: SERIAL NUMBER; and ENDING DATE. Under "SERIAL NUMBER", serial numbers of devices are registered. Under "ENDING DATE", contract ending dates of the corresponding devices are registered.

For example, the contract information 112 includes a registered record with a serial number of "A"; and an ending date of "2021/01/31". This record indicates that the rental contract of the router 300 expires on Jan. 31, 2021.

In the contract information 112, records indicating the ending dates of the individual rental contracts of the routers 313 and 323, the storage devices 311 and 321, and the servers 312, 322, and 331 are also registered in the same way.

Figure 7:
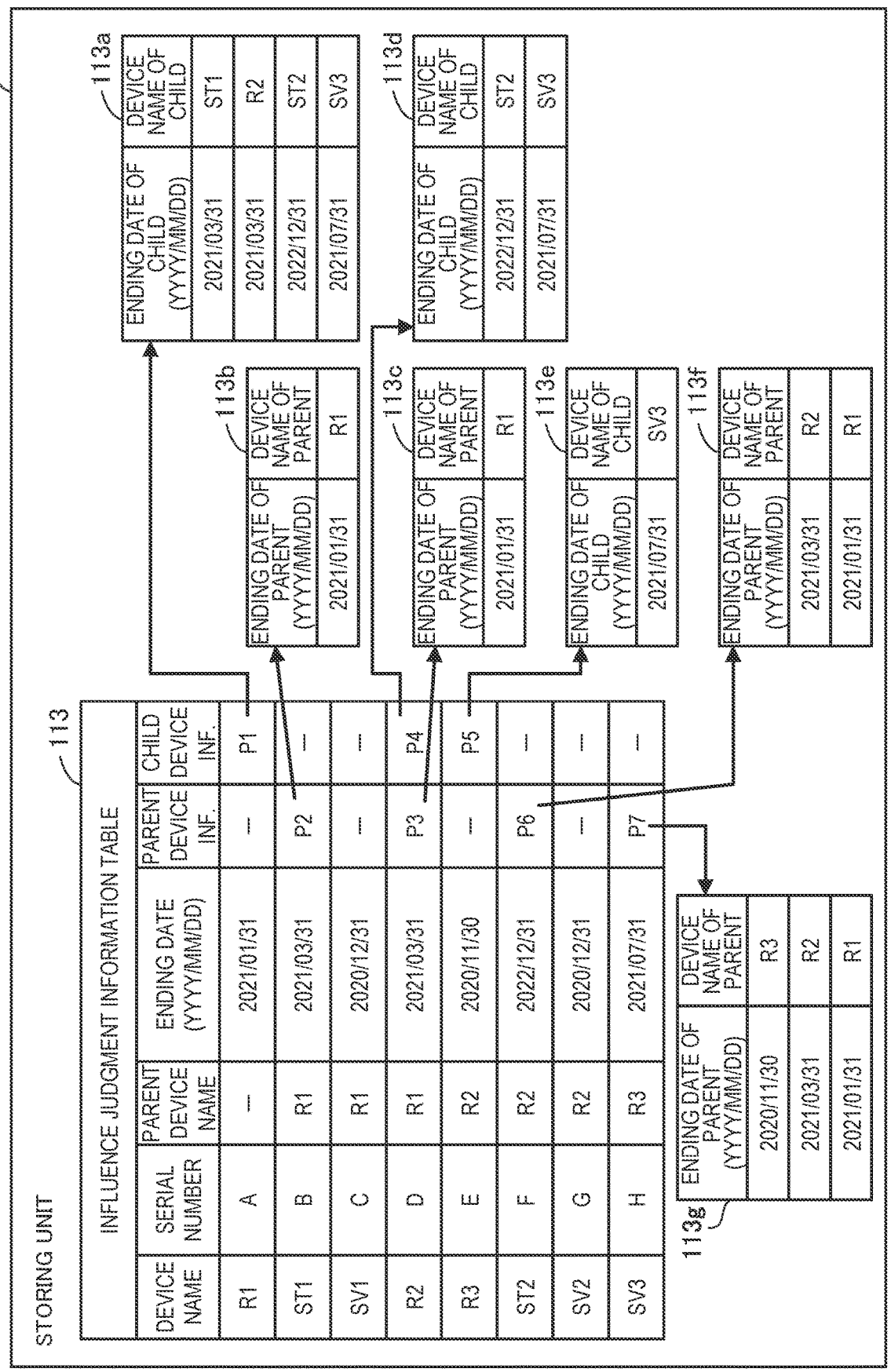
FIG. 7 illustrates an example of an influence judgment information table.

FIG. 7 illustrates an example of an influence judgment information table.

An influence judgment information table 113 is generated by the influence judgment information managing unit 121 and the influence judgment controlling unit 122 based on the network path information 111 and the contract information 112, and then stored in the storing unit 110. The influence judgment information table 113 includes the following items: DEVICE NAME; SERIAL NUMBER; PARENT DEVICE NAME; ENDING DATE; PARENT DEVICE INFORMATION; and CHILD DEVICE INFORMATION.

Under "DEVICE NAME", the names of the devices are registered. Under "SERIAL NUMBER", the serial numbers of the devices are registered. Under "PARENT DEVICE NAME", each field contains the name of a device immediately above the corresponding device. Under "ENDING DATE", each field contains the ending date of the rental contract of the corresponding device.

Under "PARENT DEVICE INFORMATION", each field contains a pointer indicating a list that enumerates, amongst devices at higher tiers than the corresponding device, those with contract ending dates coming before the contract ending date of the corresponding device. This list is referred to as a parent device list, and stored in the storing unit 110.

Note that the devices with the contract ending dates coming before the contract ending date of the corresponding device amongst devices at higher tiers than the corresponding device may be rephrased as "devices having older contract ending dates than that of the corresponding device amongst devices superordinate to the corresponding device".

Under "CHILD DEVICE INFORMATION", each field contains a pointer indicating a list that enumerates, amongst devices at lower tiers than the corresponding device, those with contract ending dates coming after the contract ending date of the corresponding device. This list is referred to as a child device list, and stored in the storing unit 110.

Note that the devices with the contract ending dates coming after the contract ending date of the corresponding device amongst devices at lower tiers than the corresponding device may be rephrased as "devices having later contract ending dates than that of the corresponding device amongst devices subordinate to the corresponding device".

For example, the influence judgment information table 113 includes a registered record with the device name "R1"; the serial number "A"; the parent device name "-" (not assigned); the ending date "2021/01/31"; the parent device information "-"; and the child device information "P1". This record indicates that the rental contract of the router 300 expires on Jan. 31, 2021, and also indicates that a child device list 113*a* is associated with this record by the pointer P1. No parent device information is assigned because there are no devices above (i.e., superordinate to) the router 300.

The child device list 113*a* enumerates, amongst the devices subordinate to the router 300, devices with the contract ending dates coming after the contract ending date of the router 300. The child device list 113*a* includes the following items: ENDIGN DATE OF CHILD; and DEVICE NAME OF CHILD. Under "ENDIGN DATE OF CHILD", each field contains the ending date of the rental contract of the corresponding child device. Under "DEVICE NAME OF CHILD", each field contains the name of the corresponding child device.

For example, amongst the devices subordinate to the router 300, the storage devices 311 and 321, the router 313, and the server 331 are those with contract ending dates coming after the contract ending date of the router 300. Therefore, the contract ending dates of the storage device 311 (device name: ST1); the router 313 (device name: R2), the storage device 321 (device name: ST2), and the server 331 (device name: SV3) are registered in the child device list 113*a*.

The influence judgment information table 113 also includes a registered record with the device name "ST1"; the serial number "B"; the parent device name "R1"; the ending date "2021/03/31"; the parent device information "P2"; and the child device information "-". This record indicates that the rental contract of the storage device 311 expires on Mar. 31, 2021, and the parent device of the storage device 311 is the router 300, and also indicates that a parent device list 113*b* is associated with this record by the pointer P2. No child device information is assigned because there are no devices below (i.e., subordinate to) the storage device 311.

The parent device list 113*b* enumerates, amongst the devices superordinate to the storage device 311, devices with the contract ending dates coming before the contract ending date of the storage device 311. The parent device list 113*b* includes the following items: ENDIGN DATE OF PARENT; and DEVICE NAME OF PARENT. Under "ENDING DATE OF PARENT", each field contains the ending date of the rental contract of the corresponding parent device. Under "PARENT DEVICE NAME", each field contains the name of the corresponding parent device.

For example, the contract ending date of the router 300 superordinate to the storage device 311 comes before that of the storage device 311. Therefore, the ending date of the rental contract of the router 300 (device name: R1) is registered in the parent device list 113*b*.

The influence judgment information table 113 also includes records including the same items as those of the router 300 and the storage device 311, individually associated with the routers 313 and 323, the storage device 321, and the servers 312, 322, and 331.

For example, a record corresponding to the router 313 (device name: R2) is associated with a parent device list 113*c* by a pointer P3 under "PARENT DEVICE INFORMATION" and with a child device list 113*d* by a pointer P4 under "CHILD DEVICE INFORMATION".

Similarly, a record corresponding to the router 323 (device name: R3) is associated with a child device list 113*e* by a pointer P5 under "CHILD DEVICE INFORMATION". A record corresponding to the storage device 321 (device name: ST2) is associated with a parent device list 113*f* by a pointer P6 under "PARENT DEVICE INFORMATION". Further, a record corresponding to the server 331 (device name: SV3) is associated with a parent device list 113*g* by a pointer P7 under "PARENT DEVICE INFORMATION".

Note that data of the parent device lists 113*c*, 113*f*, and 113*g* are structured in the same manner as the parent device list 113*b*. In addition, data of the child device lists 113*d* and 113*e* are structured in the same manner as the child device list 113*a*.

The influence extent outputting unit 123 is able to output, based on the influence judgment information table 113, an influence extent which indicates the effect of each device on its subordinate devices and the effect of its superordinate devices on the device.

For example, the record of the router 300 (device name: R1) in the influence judgment information table 113 is associated with the child device list 113*a* by the pointer P1. Therefore, the influence extent outputting unit 123 detects, based on the child device list 113*a*, that the storage device 311 (device name: ST1), the router 313 (device name: R2), the storage device 321 (device name: ST2), and the server 331 (device name: SV3) are going to be affected when the rental contract of the router 300 expires on Jan. 31, 2021.

The influence extent outputting unit 123 also detects, based on the child device list 113*a*, that the effect on the storage devices 311 and 321, the router 313, and the server 331 may be circumvented by changing the contract ending date of the router 300 to Dec. 31, 2022, or later.

The record of the router 313 (device name: R2) in the influence judgment information table 113 is associated with the parent device list 113*c* by the pointer P3 and the child device list 113*d* by the pointer P4. Therefore, the influence extent outputting unit 123 detects, based on the child device list 113*d*, the storage device 321 (device name: ST2) and the server 331 (device name: SV3) are going to be affected when the rental contract of the router 313 expires on Mar. 31, 2021.

The influence extent outputting unit 123 also detects, based on the child device list 113*d*, that the effect on the storage device 321 and the server 331 may be circumvented by changing the contract ending date of the router 313 to Dec. 31, 2022, or later.

Further, the influence extent outputting unit 123 detects, based on the parent device list 113*c*, that the router 313 is going to be affected when the rental contract of the router 300 (device name: R1) expires on Jan. 31, 2021.

The influence extent outputting unit 123 displays, based on the influence judgment information table 113, an influence extent display screen on the display 51 or the like to present the detected influence extent.

Figure 8:
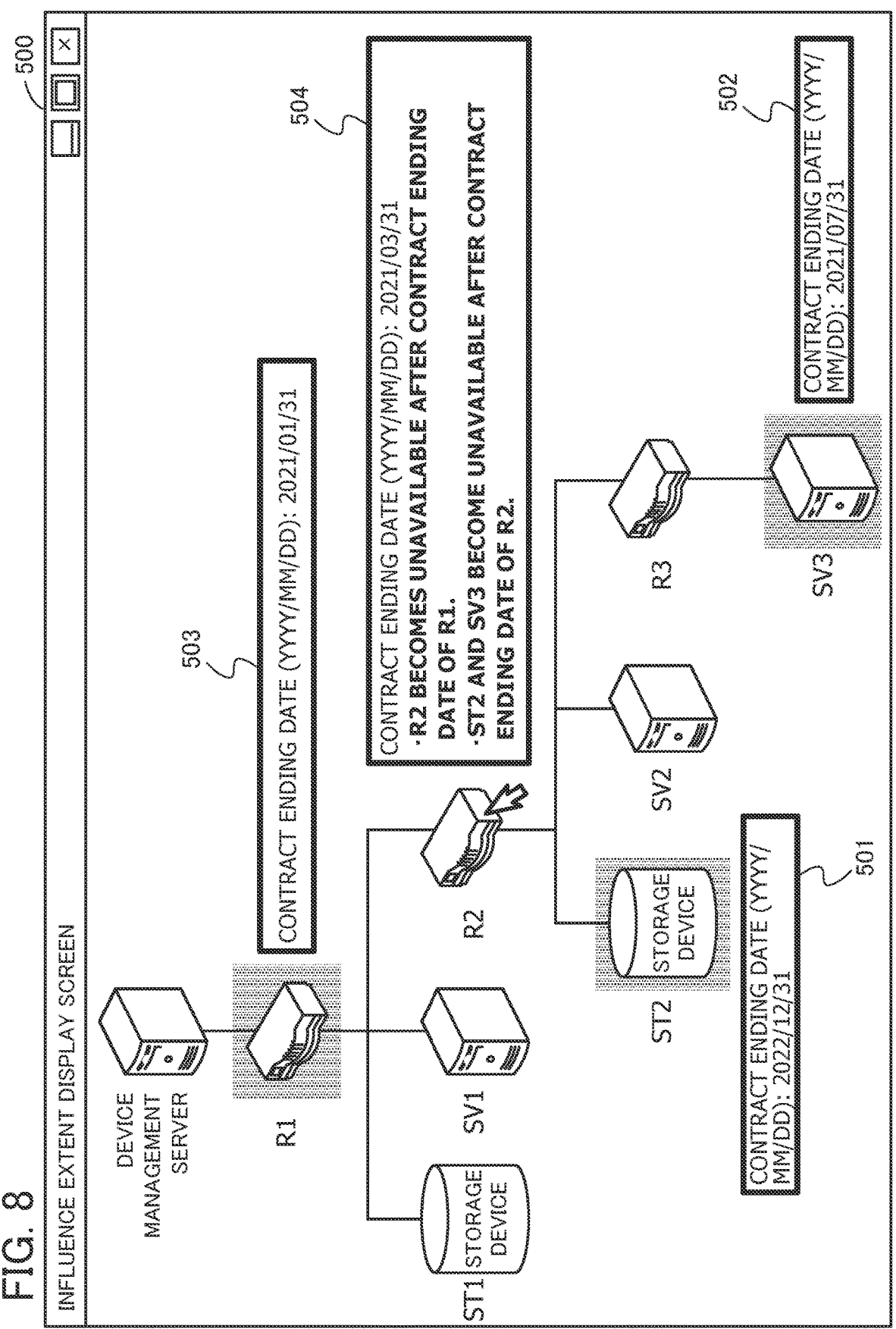
FIG. 8 illustrates an example of an influence extent display screen.

FIG. 8 illustrates an example of the influence extent display screen.

An influence extent display screen 500 is presented on the display 51. The influence extent outputting unit 123 generates screen information representing the influence extent display screen 500 based on the influence judgment information table 113, and outputs the generated screen information to the display 51, to thereby display the influence extent display screen 500 on the display 51. Note however that the influence extent outputting unit 123 may transmit the screen information to the terminal device 400 and cause the terminal device 400 to present the influence extent display screen 500 on its display.

The influence extent display screen 500 includes an image representing the connection relationships of the routers 300, 313, and 323, the storage devices 311 and 321, and the servers 312, 322, and 331. On the image, icons individually representing the routers 300, 313, and 323, the storage devices 311 and 321, and the servers 312, 322, and 331 are connected by lines reflecting actual connections. In this manner, the image represents connection relationships of the individual devices.

The business operator-side administrator operating the contract management server 100 or the user-side administrator operating the terminal device 400 selects an icon on the image using, for example, the input device 52 to thereby enter the selection of a device corresponding to the icon into the contract management server 100. The influence extent outputting unit 123 receives the entry and causes, based on the identification information of the selected device and the influence judgment information table 113, the influence extent display screen 500 to highlight subordinate devices affected by the selected device and superordinate devices affecting the selected device.

The influence extent display screen 500 of FIG. 8 illustrates a case where the router 313 has been selected. According to the influence judgment information table 113, the child device list 113*d* is associated with the router 313. The child device list 113*d* includes records of the storage device 321 (device name: ST2) and the server 331 (device name: SV3). Therefore, the influence extent outputting unit 123 highlights the icons of the storage device 321 and the server 331 on the influence extent display screen 500.

The influence extent outputting unit 123 displays, based on the child device list 113*d*, a message 501 indicating the contract ending date of the storage device 321 and a message 502 indicating the contract ending date of the server 331 on the influence extent display screen 500.

The parent device list 113*c* is also associated with the router 313 according to the influence judgment information table 113. The parent device list 113*c* includes a record of the router 300 (device name: R1). Therefore, the influence extent outputting unit 123 highlights the icon of the router 300 on the influence extent display screen 500.

The influence extent outputting unit 123 displays, based on the parent device list 113*c*, a message 503 indicating the contract ending date of the router 300 on the influence extent display screen 500.

Further, the influence extent outputting unit 123 displays, on the influence extent display screen 500, a message 504 indicating the contract ending date of the selected router 313 and details of the influences for its superordinate and subordinate devices.

For example, the message 504 associated with the router 313 (device name: R2) includes a statement of the effect on the router 313 due to contract expiration of its superordinate device, reading "R2 becomes unavailable after the contract ending date of R1." The message 504 also includes a statement of the effect on subordinate devices due to contract expiration of the router 313, reading "ST2 and SV3 become unavailable after the contract ending date of R2."

The message 504 may also include a reminder to prompt the user to set the contract ending dates of all the router 313, the storage device 321, and the server 331 to the same date. For example, the influence extent outputting unit 123 may output the message 504 including a statement urging a review of the contract ending dates, reading "ST2 and SV3 become unavailable after the contract ending date of R1. Please review their contract ending dates." Alternatively, the message 504 output by the influence extent outputting unit 123 may include a suggestion on extending the end time in a contract renewal, reading "It is recommended to extend the contract of the router 313 to Dec. 31, 2022, or later."

Next described are processing procedures conducted by the contract management server 100 and the device management server 200. The processing procedure of the device management server 200 is described first.

Figure 9:
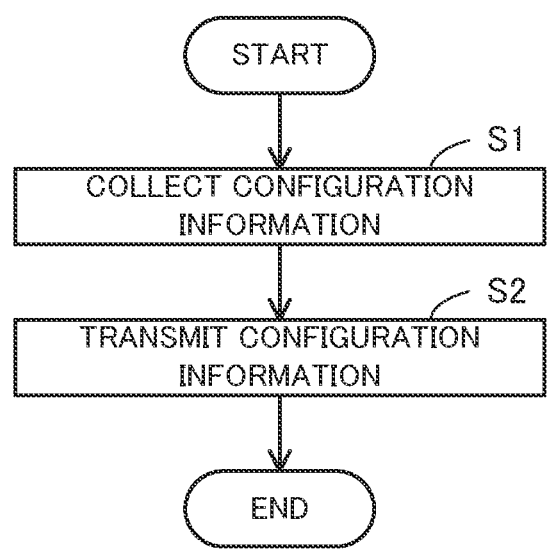
FIG. 9 is a flowchart illustrating an example of processes run by the device management server.

FIG. 9 is a flowchart illustrating an example of processes run by the device management server.

The device management server 200 regularly performs the following process.

(Step S1) The configuration information collecting unit 221 collects the configuration information of the routers 300, 313, and 323, the storage devices 311 and 321, and the servers 312, 322, and 331 and then stores it in the storing unit 210. The configuration information collecting unit 221 generates, based on the configuration information, the network path information 111 and then stores it in the storing unit 210. Upon update of the configuration information, the configuration information collecting unit 221 also updates the network path information 111.

(Step S2) The notifying unit 222 transmits the configuration information and the network path information 111 generated by the configuration information collecting unit 221 to the contract management server 100.

The processing procedure of the contract management server 100 is described next.

Figure 10:
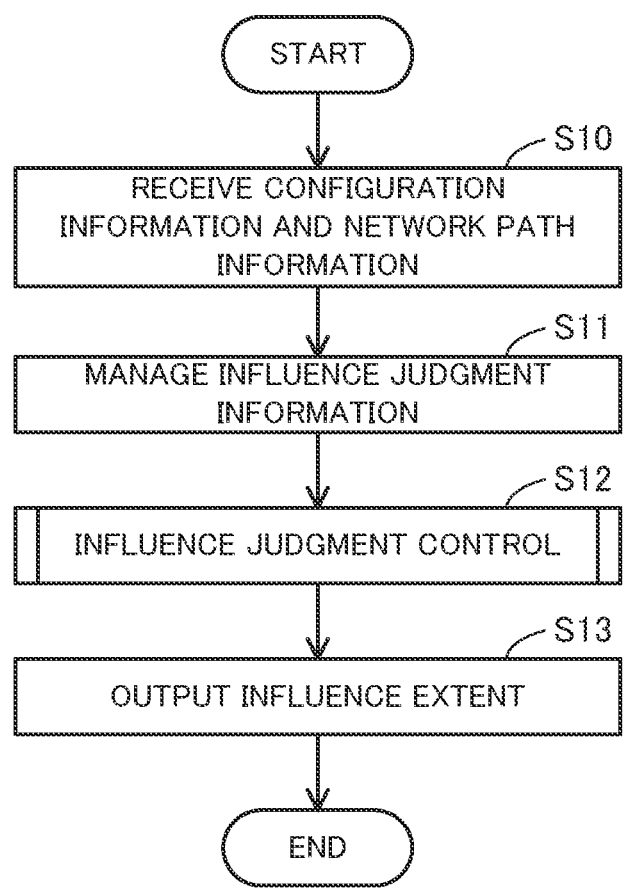
FIG. 10 is a flowchart illustrating an example of processes run by the contract management server.

FIG. 10 is a flowchart illustrating an example of processes run by the contract management server.

(Step S10) The influence judgment information managing unit 121 receives the configuration information and the network path information 111 from the device management server 200 and stores them in the storing unit 110.

(Step S11) The influence judgment information managing unit 121 performs an influence judgment information management process. Specifically, the influence judgment information managing unit 121 performs a process of mapping the contract ending dates included in the contract information 112 to the information of devices included in the received network path information 111, using the serial numbers of the devices as keys. The influence judgment information managing unit 121 adds records indicating the mapping results to the influence judgment information table 113. At step S11, the parent device information and the child device information have yet to be registered in the records.

(Step S12) The influence judgment controlling unit 122 performs an influence judgment control process. Specifically, the influence judgment controlling unit 122 judges the effect on other devices due to contract expiration of each device based on the parent and child relationship of the device included in the influence judgment information table 113 and the contract ending date of the device. The influence judgment controlling unit 122 generates a parent device list and a child device list for each device based on the results of the influence judgment, and adds, to a record of the device in the influence judgment information table 113, pointers that indicate association of the device with the generated parent device list and child device list. The procedure of the influence judgment control is described in detail below.

(Step S13) The influence extent outputting unit 123 performs an influence extent output process. Specifically, the influence extent outputting unit 123 outputs, based on the influence judgment information table 113, information about the effect on other devices due to contract expiration of a particular device. For example, with respect to a device selected by the business operator-side administrator operating the contract management server 100, the influence extent outputting unit 123 displays the influence extent display screen 500 on the display 51. Alternatively, the influence extent outputting unit 123 may transmit, with respect to a device selected by the user-side administrator operating the terminal device 400, screen information of the influence extent display screen 500 to the terminal device 400 and cause the terminal device 400 to present the influence extent display screen 500 on its display. Subsequently, the process of the contract management server 100 ends.

Note that step S13 may be executed in asynchronous with steps S10 to S12. It may be considered that, for example, the influence extent outputting unit 123 regularly detects, based on the influence judgment information table 113, a device with the contract end time coming after a predetermined time from the present time, then performs the influence extent outputting process of step S13, and presents the effect of contract expiration of the device to the user. Here, "a predetermined time from the present time" is, for example, one week or one month from the present time.

Figure 11:
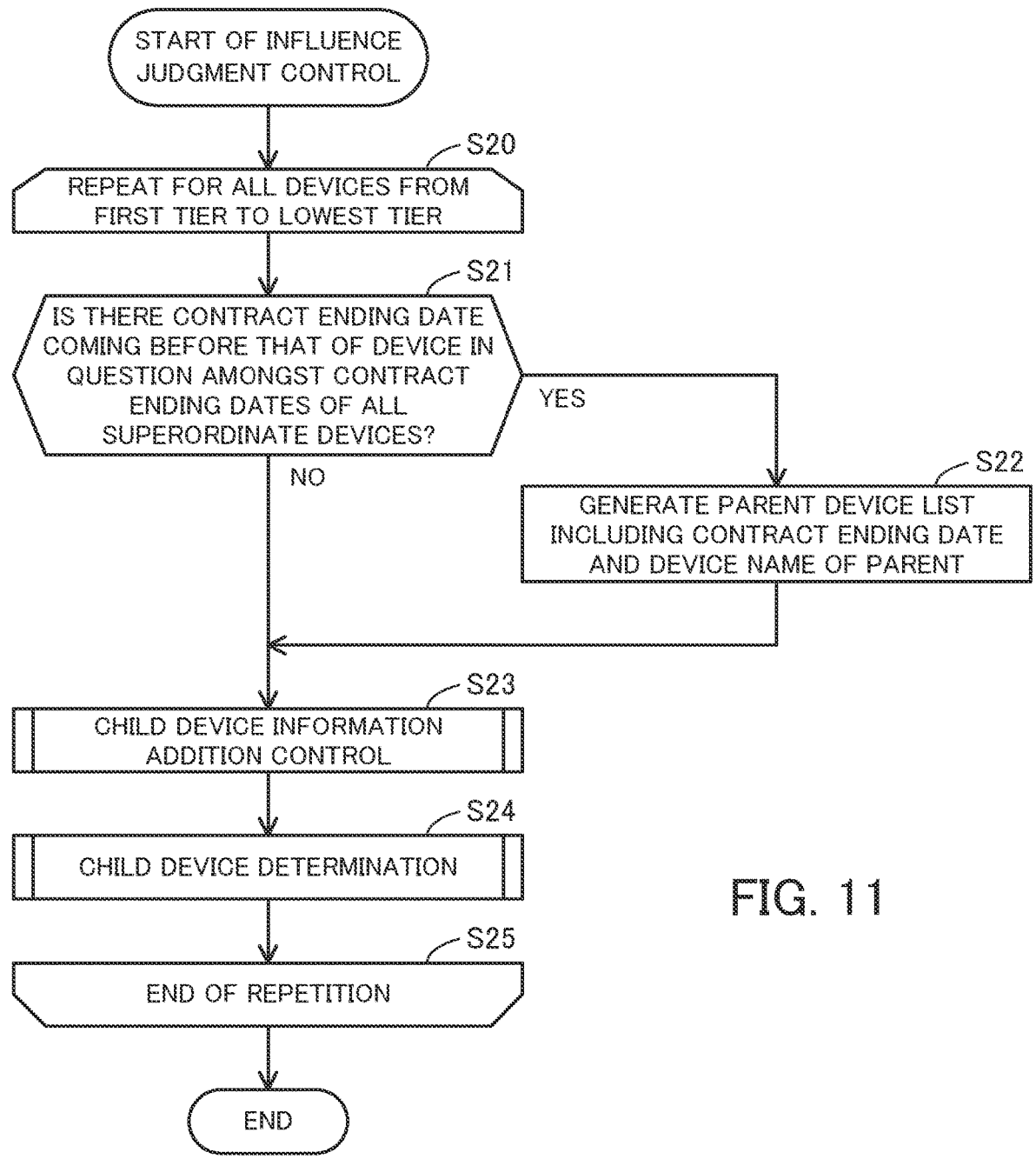
FIG. 11 is a flowchart illustrating an example of an influence judgment control process.

FIG. 11 is a flowchart illustrating an example of the influence judgment control process.

The influence judgment control process corresponds to step S12.

(Step S20) The influence judgment controlling unit 122 repeats steps S21 to S24 for all the devices from the first tier to the lowest tier. In this example, the first-tier device is the router 300, and the first processing target device is, therefore, the router 300. A processing target device in the following procedure is referred to as the "device in question".

(Step S21) The influence judgment controlling unit 122 determines whether there is one or more contract ending dates coming before that of the device in question amongst the contract ending dates of all devices superordinate to the device in question. If the determination is affirmative, the influence judgment controlling unit 122 moves to step S22. If the determination is negative, the influence judgment controlling unit 122 moves to step S23.

(Step S22) The influence judgment controlling unit 122 generates a parent device list that includes device names and contract ending dates of devices with the contract ending dates coming before that of the device in question amongst the contract ending dates of all devices superordinate to the device in question. The influence judgment controlling unit 122 registers a pointer pointing to the generated parent device list in a record corresponding to the device in question under "PARENT DEVICE INFORMATION" of the influence judgment information table 113.

(Step S23) The influence judgment controlling unit 122 performs child device information addition control. Specifically, the influence judgment controlling unit 122 generates a child device list of the device in question by comparing the contract ending date of the device in question with those of devices subordinate to the device in question. The procedure of the child device information addition control is described in detail below.

(Step S24) The influence judgment controlling unit 122 performs a child device determination process. Specifically, the influence judgment controlling unit 122 determines whether there is a child device of the device in question and decides a next device in question according to the determination. The child device determination process is described in detail below.

(Step S25) Upon the completion of steps S21 to S24 for all the devices from the first tier to the lowest tier, the influence judgment controlling unit 122 ends the repetition and finishes the influence judgment control process.

Figure 12:
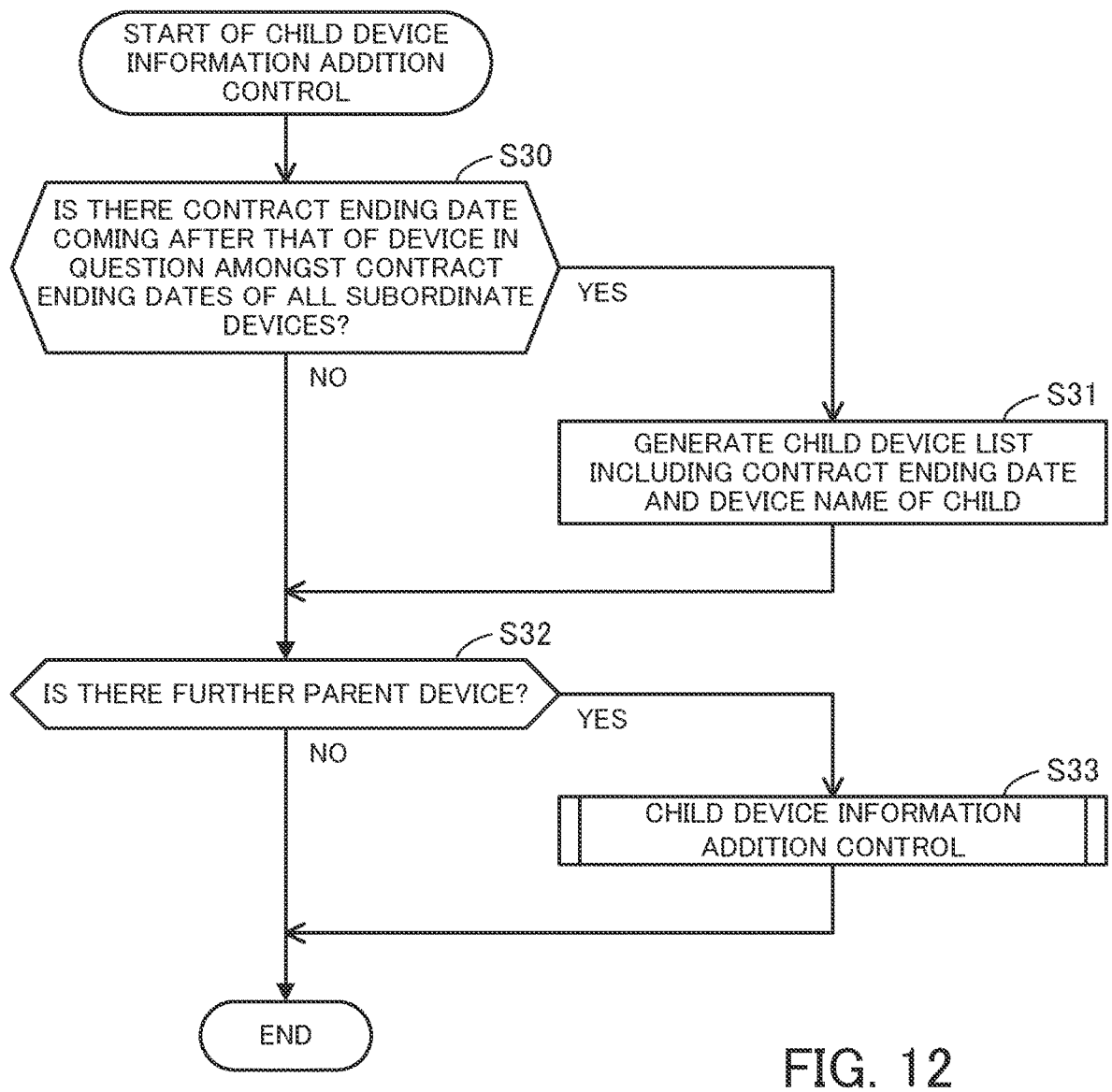
FIG. 12 is a flowchart illustrating an example of a child device information addition control process.

FIG. 12 is a flowchart illustrating an example of a child device information addition control process.

The child device information addition control process corresponds to step S23.

(Step S30) The influence judgment controlling unit 122 determines whether there is one or more contract ending dates coming after that of the device in question amongst the contract ending dates of all devices subordinate to the device in question. If the determination is affirmative, the influence judgment controlling unit 122 moves to step S31. If the determination is negative, the influence judgment controlling unit 122 moves to step S32.

(Step S31) The influence judgment controlling unit 122 generates a child device list that includes device names and contract ending dates of devices with the contract ending dates coming after that of the device in question amongst the contract ending dates of all devices subordinate to the device in question. The influence judgment controlling unit 122 registers a pointer pointing to the generated child device list in a record corresponding to the device in question under "CHILD DEVICE INFORMATION" of the influence judgment information table 113.

(Step S32) The influence judgment controlling unit 122 further determines whether the device in question has a further parent device. If the determination is affirmative, the influence judgment controlling unit 122 moves to step S33. If the determination is negative, the influence judgment controlling unit 122 ends the child device information addition control process. Here, the "parent device" is a parent device of the device in question, whose first-tier device is not the router 300.

(Step S33) The influence judgment controlling unit 122 performs the child device information addition control process using the parent device of the device currently in question as a device in question.

Note that in the case where a first-tier device of a set of devices exists while a first-tier device of a different set of devices also exists, it may be considered appropriate that the influence judgment controlling unit 122 performs the influence judgment control process on the first-tier device of each of the sets. In this case, the influence judgment controlling unit 122 may skip steps S32 and S33.

Figure 13:
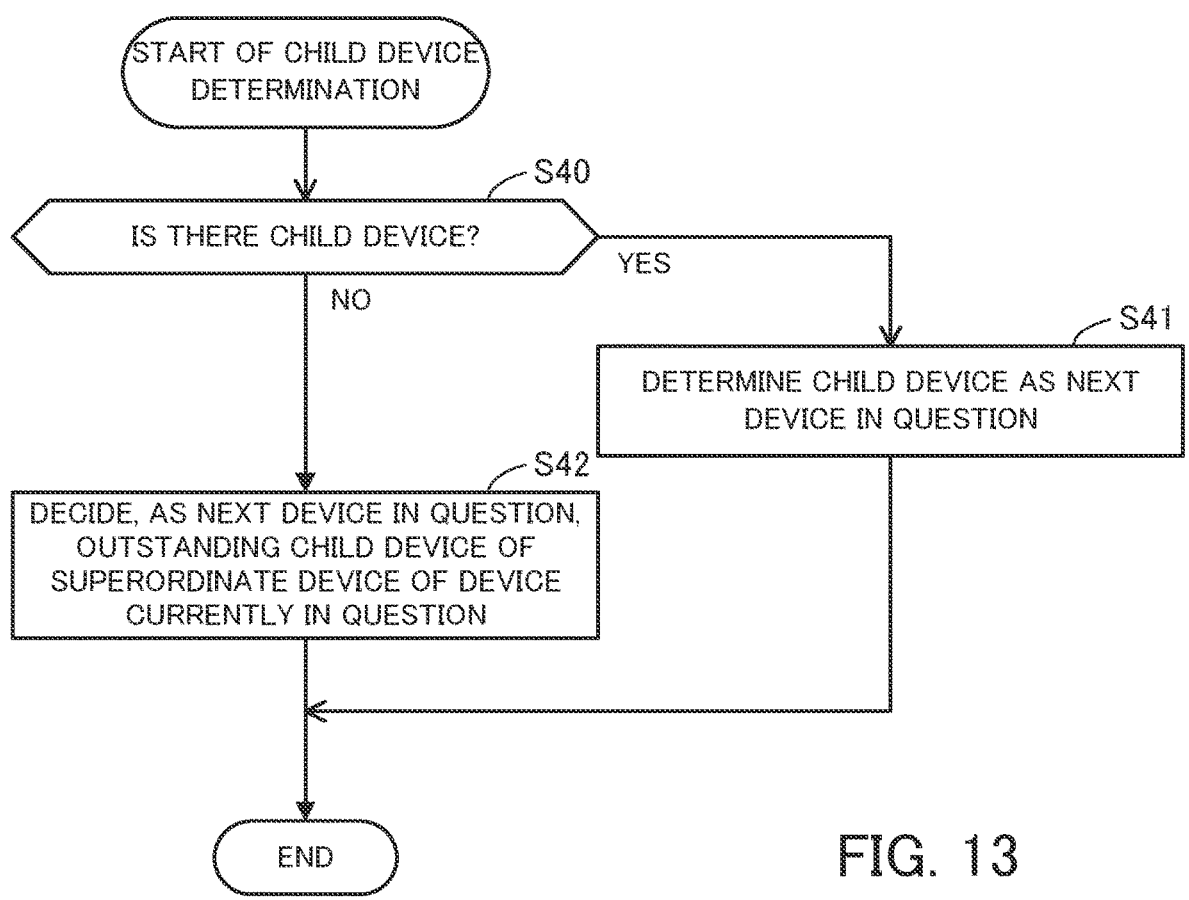
FIG. 13 is a flowchart illustrating an example of a child device determination process.

FIG. 13 is a flowchart illustrating an example of a child device determination process.

The child device determination process corresponds to step S24.

(Step S40) The influence judgment controlling unit 122 determines, based on the influence judgment information table 113, whether the device in question has a child device. If the determination is affirmative, the influence judgment controlling unit 122 moves to step S41. If the determination is negative, the influence judgment controlling unit 122 moves to step S42.

(Step S41) The influence judgment controlling unit 122 decides a relevant child device as the next device in question. The influence judgment controlling unit 122 then ends the child device determination process.

(Step S42) The influence judgment controlling unit 122 decides, as the next device in question, an outstanding one of child devices of a superordinate device of the device currently in question, that is, a device having yet undergone the influence judgment control process. Then, the influence judgment controlling unit 122 ends the child device determination process. No relevant device being found in step S42 means that the influence judgment control process has been performed on all devices targeted for the influence judgment control process. In this case, the influence judgment controlling unit 122 decides no next device in question and ends the child device determination process, and then finishes the influence judgment control process of FIG. 11.

Thus, the influence judgment controlling unit 122 makes influence judgments by selecting a device in question preferentially in the depth direction from the first tier toward the lowest tier. Then, when reaching a terminal device at the lowest tier, the influence judgment controlling unit 122 traces back to select a next device in question and makes influence judgments. Herewith, the influence judgment controlling unit 122 sequentially generates a parent device list and a child device list with respect to a record of each device listed in the influence judgment information table 113. Based on the influence judgment information table 113, the parent device list, and the child device list, the influence extent outputting unit 123 presents, to the user, the extent of the influences of the rental contract expiration with a device selected by the user as a starting point.

For example, in response to selection of the router 313 made by the user, the influence extent outputting unit 123 displays the influence extent display screen 500 on the display 51 or on a display of the terminal device 400. That is, the influence extent outputting unit 123 informs the user of the storage device 321 and the server 331 being affected by contract expiration of the router 313.

Herewith, the contract management server 100 is able to prompt the user to review, e.g., extend, the expiration of the contract term of the router 313 and thus supports the user by preventing the storage device 321 and the server 331 from being affected by expiration of the contract of the router 313. The contract management server 100 also supports the user to be able to continue operations of the user's system and services running on the system.

In addition, in response to selection of the router 313 made by the user, the influence extent outputting unit 123 indicates the user that the router 313 is going to be affected by expiration of the contract of the router 300.

Herewith, the contract management server 100 is able to prompt the user to review, e.g., extend, the expiration of the contract term of the router 300 and thus supports the user to prevent the router 313 from being affected by expiration of the contract of the router 300. In addition, the contract management server 100 is able to collectively present, to the user, the extent of the influences within the system of the user, where devices bear parent and child relationships with the router 313 specified by the user as a starting point. Therefore, the contract management server 100 is able to support the user to readily comprehend the extent of the influences associated with the device selected by the user. Especially, the contract management server 100 is able to help the user to collectively review contract periods of multiple devices.

As has been described above, the contract management server 100 performs, for example, the following processes.

The storing unit 110 stores contract information indicating, with respect to each of multiple devices rented to a user and constituting a system, when the rental contract of the device expires; and communication channel information indicating inter-device communication channels among the multiple devices. Based on the contract information and the communication channel information, the influence judgment controlling unit 122 identifies, amongst the multiple devices, a second device which is going to be affected by expiration of the contract of a first device at a first time point. The influence extent outputting unit 123 outputs information about the effect on the second device.

Herewith, it is possible to prevent devices with the contracts continuing in effect from being affected. The router 300, the storage devices 311 and 321, the servers 312, 322, and 331, and the routers 313 and 323 are an example of the multiple devices rented to the user. The network path information 111 is an example of the communication channel information.

Note that the processes of the influence judgment controlling unit 122 and the influence extent outputting unit 123 may be rephrased as follows. Based on the contract information and the communication channel information, the influence judgment controlling unit 122 determines whether, amongst the multiple devices, there is a second device which is going to be affected by expiration of the contract of a first device at a first time point. Based on the determination results of the influence judgment controlling unit 122, the influence extent outputting unit 123 outputs information about the effect on the second device when the second device exists. On the other hand, when there is no such a second device, the influence extent outputting unit 123 does not output this information.

In determining the second device, the influence judgment controlling unit 122 identifies, amongst the multiple devices, each device with the contract expiring after the first time point as the second device.

The second device with the contract remaining valid after expiration of the contract of the first device is affected because of not being able to communicate with the first device once the contract of the first device expires. Therefore, the influence judgment controlling unit 122 identifies, amongst the multiple devices, the second device with the contract expiring after the first time point, to thereby appropriately identify the second device.

The influence extent outputting unit 123 may also output the time when the second device becomes affected by expiration of the contract of the first device.

For example, in the influence extent display screen 500 of FIG. 8, the router 313 (device name: R2) is an example of the first device while the storage device 321 (device name: ST2) and the server 331 (device name: SV3) are individually examples of the second device. In this case, the influence extent outputting unit 123 outputs the contract ending dates of the router 313, the storage device 321, and the server 331, as depicted by the messages 501, 502, and 504, respectively, to thereby output the times when the storage device 321 and the server 331 become affected.

For example, the messages 501 and 504 help the user to understand that the storage device 321 becomes affected from the next day of the contract ending date of the router 313 (Mar. 31, 2021) until the contract ending date of the storage device 321 (Dec. 31, 2022). Further, the messages 502 and 504 help the user to understand that the server 331 becomes affected from the next day of the contract ending date of the router 313 (Mar. 31, 2021) until the contract ending date of the server 331 (Jul. 31, 2021).

Herewith, the contract management server 100 is able to support the user to have a proper understanding of how much extension or shortening needs to be made to the contract period of a device affecting a different device or affected by a different device.

Further, the influence judgment controlling unit 122 detects that the first device is affected when the contract of a third device amongst the multiple devices expires at a second time point. The influence extent outputting unit 123 outputs, not only information about the effect on the second device, but also information about the effect on the first device.

Thus, the contract management server 100 collectively presents, to the user, not only the effect of the first device on a different device, but also the effect of a different device on the first device, to thereby support the user to have a proper understanding of a device of which contract needs to be revised. Note that the influence extent outputting unit 123 may also output the period during which the first device is affected by expiration of the contract of the third device.

Note that the processes of the influence judgment controlling unit 122 and the influence extent outputting unit 123 may be rephrased as follows. Based on the contract information and the communication channel information, the influence judgment controlling unit 122 determines whether, amongst the multiple devices, there is a third device which is going to affect the first device due to the rental contract of the third device expiring at the second time point. Based on the determination results of the influence judgment controlling unit 122, the influence extent outputting unit 123 outputs information about the effect on the first device when the third device exists. On the other hand, when there is no such a third device, the influence extent outputting unit 123 does not output this information.

In detecting the effect on the first device, the influence judgment controlling unit 122 identifies, amongst the multiple devices, each device with the contract expiring before the first time point as the third device.

In the case where the contract of the first device is valid after expiration of the contract of the third device, the first device is affected because of not being able to communicate with the third device once the contract of the third device expires. Therefore, the influence judgment controlling unit 122 identifies, amongst the multiple devices, the third device with the contract expiring before the first time point, to thereby appropriately identify the third device.

In response to selection of the first device, the influence judgment controlling unit 122 may identify the second device out of devices subordinate to the first device amongst the multiple devices, and also identify the third device out of devices superordinate to the first device amongst the multiple devices.

Herewith, using a single screen as illustrated, for example, by the influence extent display screen 500, the contract management server 100 is able to readily present, to the user, the effect associated with each device having a parent and child relationship with the first device. Therefore, it is possible to support the user to have a proper understanding of a device of which contract needs to be revised amongst the first device and the devices individually having a parent and child relationship with the first device.

The influence extent outputting unit 123 may cause a display unit to present an image with the multiple devices and inter-device communication channels among them. Further, the influence extent outputting unit 123 may cause the display unit to present a message indicating that the second device is affected by expiration of the contract of the first device and the first device is affected by expiration of the contract of the third device.

Herewith, the contract management server 100 is able to support the user to have a proper understanding of the effect on each device having a parent and child relationship with the first device. The message 504 is an example of messages displayed by the display unit. The display 51 and the display of the terminal device 400 are examples of the display unit.

In addition, the influence extent outputting unit 123 may receive selection of a first device from the user. In this case, the influence extent outputting unit 123 acquires the judgment results of a second device and a third device corresponding to the first device selected by the user, obtained by the influence judgment controlling unit 122, and then outputs information about the effect associated with the second device and the third device.

This allows the contract management server 100 to support the user to check the second device and the third device of the device selected by the user.

Alternatively, the influence extent outputting unit 123 may select a device of which contract is going to expire after a predetermined time from the present time as the first device. In this case, the influence extent outputting unit 123 acquires the judgment results of a second device and a third device corresponding to the selected first device, obtained by the influence judgment controlling unit 122, and then outputs information about the effect associated with the second device and the third device.

In this manner, the contract management server 100 is able to properly remind the user of the effect associated with upcoming expiration of the contract of the device.

Note that the information processing of the first embodiment is implemented by causing the processing unit 12 to execute a program. In addition, the information processing of the second embodiment is implemented by causing the CPU 101 to execute a program. Such a program may be recorded in the computer-readable storage medium 53.

For example, the storage media 53 on which the program is recorded are distributed in order to deliver the program to individual recipients. In addition, the program may be stored in a different computer and then distributed via a network. A computer stores, or installs, the program recorded in the storage medium 53 or received from the different computer in a storage device, such as the RAM 102 or the HDD 103, and reads the program from the storage device to execute it.

According to one aspect, it is possible to prevent devices with the contracts continuing in effect from being affected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein an operation information management program that causes a computer to execute a process comprising:

determining, based on contract information indicating, with respect to each of a plurality of devices rented to a user and included in a system, an expiration time point at which a rental contract of the each of the plurality of devices expires and communication channel information indicating inter-device communication channels between the plurality of devices, a second device to experience effect of expiration of the rental contract of a first device at a first time point amongst the plurality of devices; and outputting information indicating the effect on the second device, wherein the process further includes:

detecting that the first device experiences effect of expiration of the rental contract of a third device at a second time point, the third device being among the plurality of devices;

identifying, in response to selection of the first device, the second device out of devices subordinate to the first device amongst the plurality of devices and the third device out of devices superordinate to the first device amongst the plurality of devices; and wherein the outputting of the information indicating the effect includes outputting information indicating the effect on the first device together with the information indicating the effect on the second device.

2. The non-transitory computer-readable recording medium according to claim 1, wherein:
the determining of the second device includes identifying, amongst the plurality of devices, the second device with the expiration time point coming after the first time point.

3. The non-transitory computer-readable recording medium according to claim 1, wherein:
the outputting of the information indicating the effect includes outputting a time during which the second device experiences the effect.

4. The non-transitory computer-readable recording medium according to claim 1, wherein:
the detecting of the first device experiencing the effect includes identifying, amongst the plurality of devices, the third device with the expiration time point coming before the first time point.

5. The non-transitory computer-readable recording medium according to claim 1, wherein:
the outputting of the information indicating the effect includes causing a display unit to display an image representing the plurality of devices and the inter-device communication channels and a message indicating that the second device experiences the effect of the expiration of the rental contract of the first device and that the first device experiences the effect of the expiration of the rental contract of the third device.

6. The non-transitory computer-readable recording medium according to claim 1, further comprising:
receiving selection of the first device made by a user or selecting, as the first device, a device with the rental contract expiring after a prescribed period from present time.

7. An operation information management method comprising:
determining, by a processor, based on contract information indicating, with respect to each of a plurality of devices rented to a user and included in a system, an expiration time point at which a rental contract of the each of the plurality of devices expires and communication channel information indicating inter-device communication channels between the plurality of devices, a second device to experience effect of expiration of the rental contract of a first device at a first time point amongst the plurality of devices; and
outputting, by the processor, information indicating the effect on the second device,
wherein the determining further includes:
detecting, by the processor, that the first device experiences effect of expiration of the rental contract of a third device at a second time point, the third device being among the plurality of devices:
identifying, by the processor, in response to selection of the first device, the second device out of devices subordinate to the first device amongst the plurality of devices and the third device out of devices superordinate to the first device amongst the plurality of devices; and
wherein the outputting of the information indicating the effect includes outputting, by the processor, information indicating the effect on the first device together with the information indicating the effect on the second device.

8. An information processing apparatus comprising:
a memory configured to store contract information indicating, with respect to each of a plurality of devices rented to a user and included in a system, an expiration time point at which a rental contract of the each of the plurality of devices expires and communication channel information indicating inter-device communication channels between the plurality of devices; and
a processor configured to execute a process including
determining, based on the contract information and the communication channel information, a second device to experience effect of expiration of the rental contract of a first device at a first time point amongst the plurality of devices, and
outputting information indicating the effect on the second device,
wherein the process further includes:
detecting that the first device experiences effect of expiration of the rental contract of a third device at a second time point, the third device being among the plurality of devices;
identifying, in response to selection of the first device, the second device out of devices subordinate to the first device amongst the plurality of devices and the third device out of devices superordinate to the first device amongst the plurality of devices; and
wherein the outputting of the information indicating the effect includes outputting information indicating the effect on the first device together with the information indicating the effect on the second device.

* * * * *

UNITED STATES PATENT AND TRADEMARK OFFICE
CERTIFICATE OF CORRECTION

| | | |
|---|---|---|
| PATENT NO. | : 12,333,619 B2 | Page 1 of 1 |
| APPLICATION NO. | : 17/752296 | |
| DATED | : June 17, 2025 | |
| INVENTOR(S) | : Kenji Nitta et al. | |

It is certified that error appears in the above-identified patent and that said Letters Patent is hereby corrected as shown below:

On the Title Page

Item (54), Column 1, Lines 1-3, Delete "OPERATION INFORMATION MANAGEMENT METHOD AND INFORMATION PROCESSING" and insert -- OPERATION INFORMATION MANAGEMENT METHOD AND INFORMATION PROCESSING APPARATUS --.

In the Specification

Column 1, Lines 1-3, Delete "OPERATION INFORMATION MANAGEMENT METHOD AND INFORMATION PROCESSING" and insert -- OPERATION INFORMATION MANAGEMENT METHOD AND INFORMATION PROCESSING APPARATUS --.

In the Claims

Column 24, Line 5, In Claim 7, delete "devices:" and insert -- devices; --.

Signed and Sealed this
Second Day of September, 2025

Coke Morgan Stewart
*Acting Director of the United States Patent and Trademark Office*